United States Patent [19]
Worrell

[11] Patent Number: 5,982,194
[45] Date of Patent: Nov. 9, 1999

[54] ARITHMETIC AND LOGIC FUNCTION CIRCUITS OPTIMIZED FOR DATAPATH LAYOUT

[75] Inventor: Frank Worrell, San Jose, Calif.

[73] Assignee: LSI Logic Corporation, Milpitas, Calif.

[21] Appl. No.: 08/579,771

[22] Filed: Dec. 28, 1995

[51] Int. Cl.⁶ .................................................. H03K 19/00
[52] U.S. Cl. ............................. 326/41; 326/101; 364/716
[58] Field of Search .................................. 326/37, 41, 53, 326/101; 364/490, 491, 716, 769, 770, 787

[56] References Cited

U.S. PATENT DOCUMENTS

| | | | |
|---|---|---|---|
| 4,652,777 | 3/1987 | Cline | 326/40 |
| 4,879,688 | 11/1989 | Turner et al. | 364/716 X |
| 5,043,988 | 8/1991 | Brglez et al. | 364/717 X |
| 5,369,314 | 11/1994 | Patel et al. | 326/44 X |

*Primary Examiner*—Jon Santamauro

[57] ABSTRACT

A technique for designing circuits with arithmetic or logic functions on integrated circuit devices. The circuit has a primary chain of serially connected logic blocks and secondary chains of serially connected logic blocks. The output node of the last logic block of each secondary chain is connected to an input node of a logic block in the primary chain. Depending upon the desired function, the logic blocks can be logic gates or more complex logic blocks. Zero detect and compare circuits can be designed from this basic arrangement. Connected with input logic, output logic and merge logic, other circuits, including incrementors, decrementors, priority logic, adders and ALUs, are possible. The resulting circuit occupies far less space on an integrated circuit than a fully parallel, lookahead circuit, yet operating speeds are comparable.

27 Claims, 11 Drawing Sheets

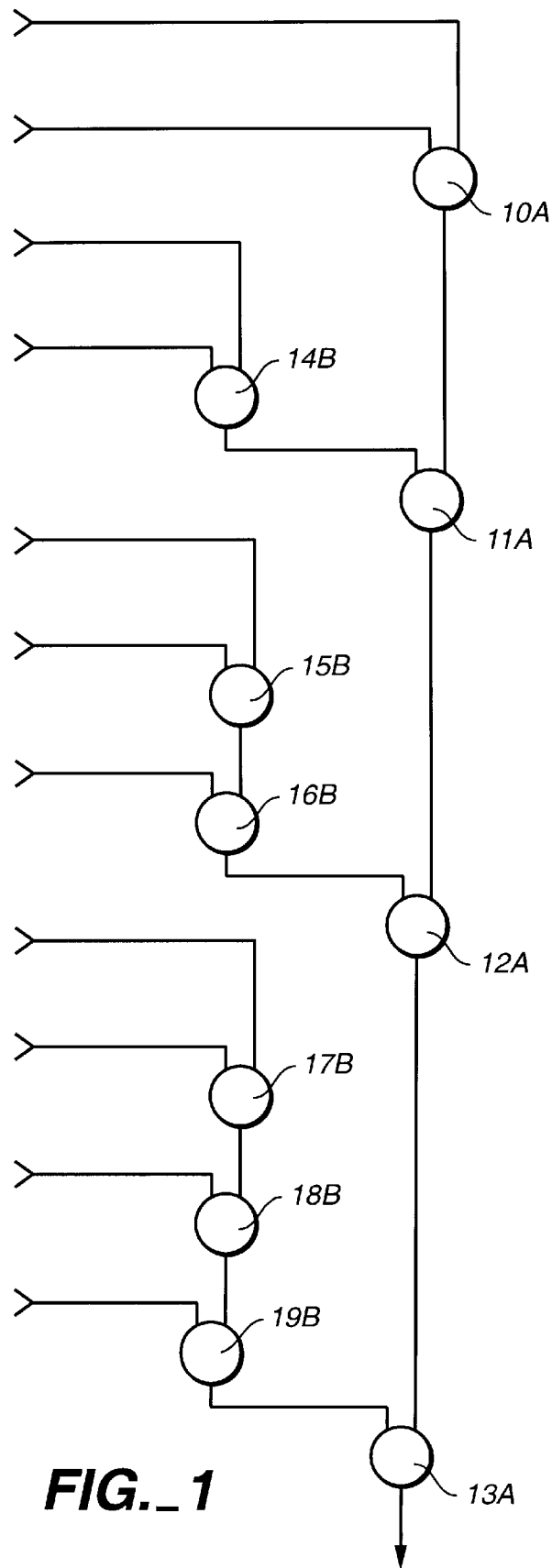
FIG._1

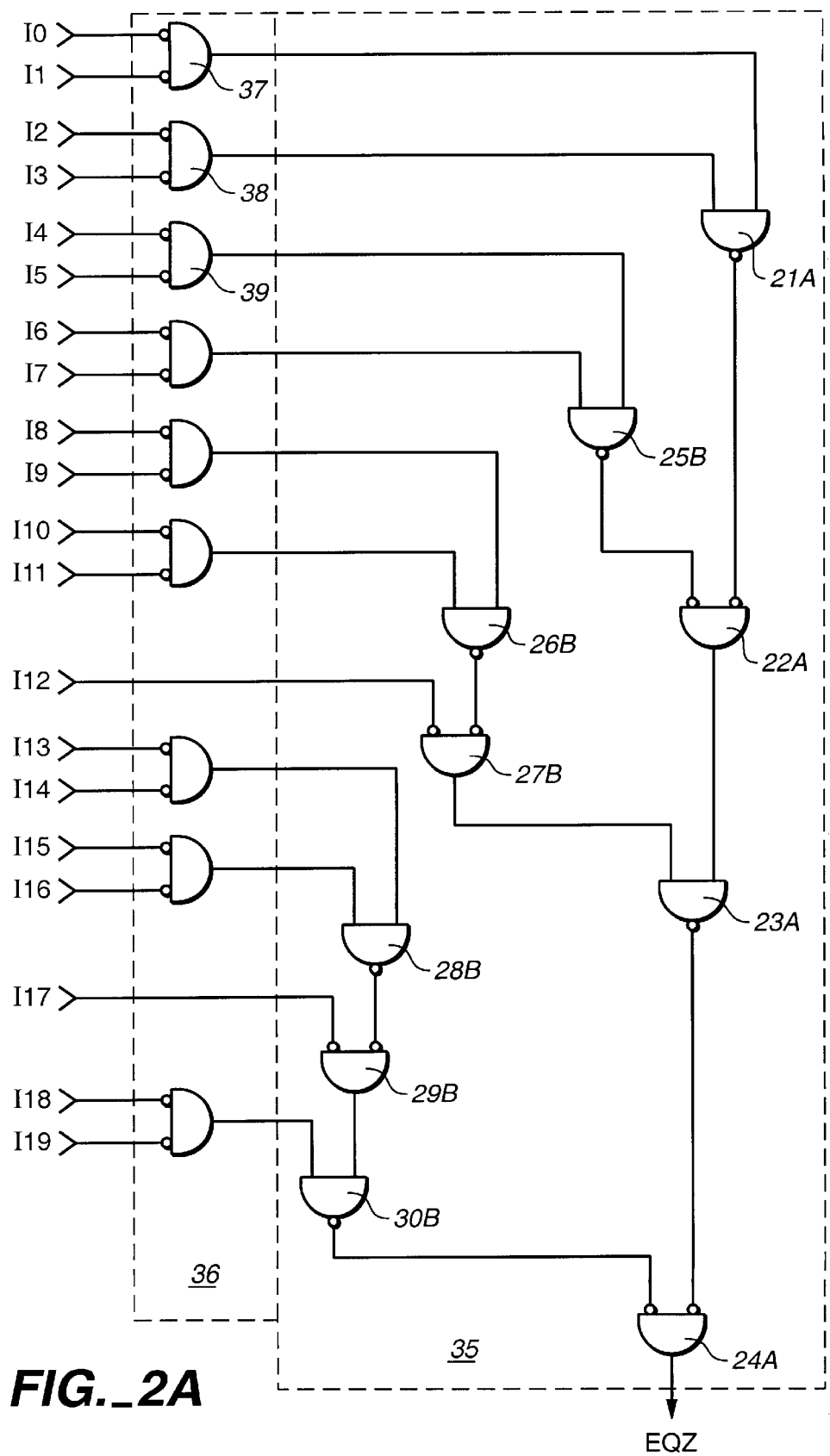
FIG._2A

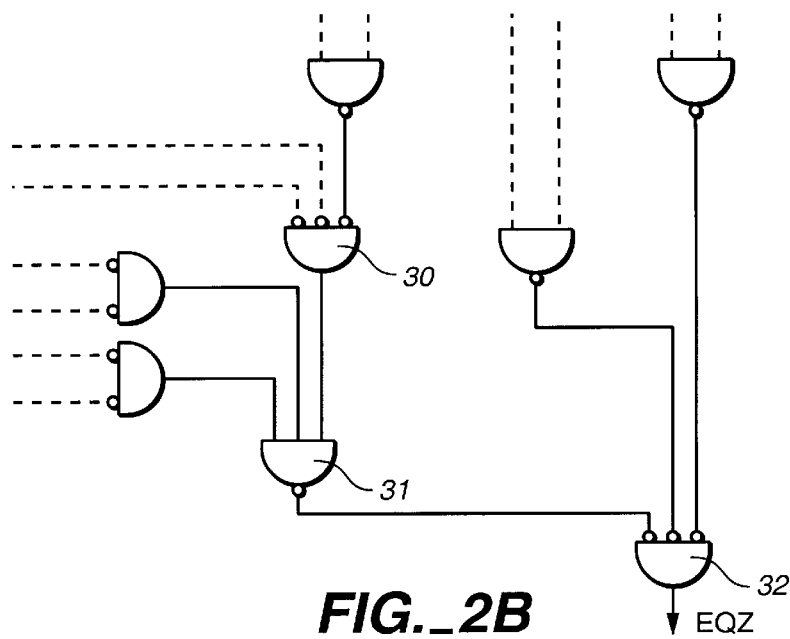
FIG._2B
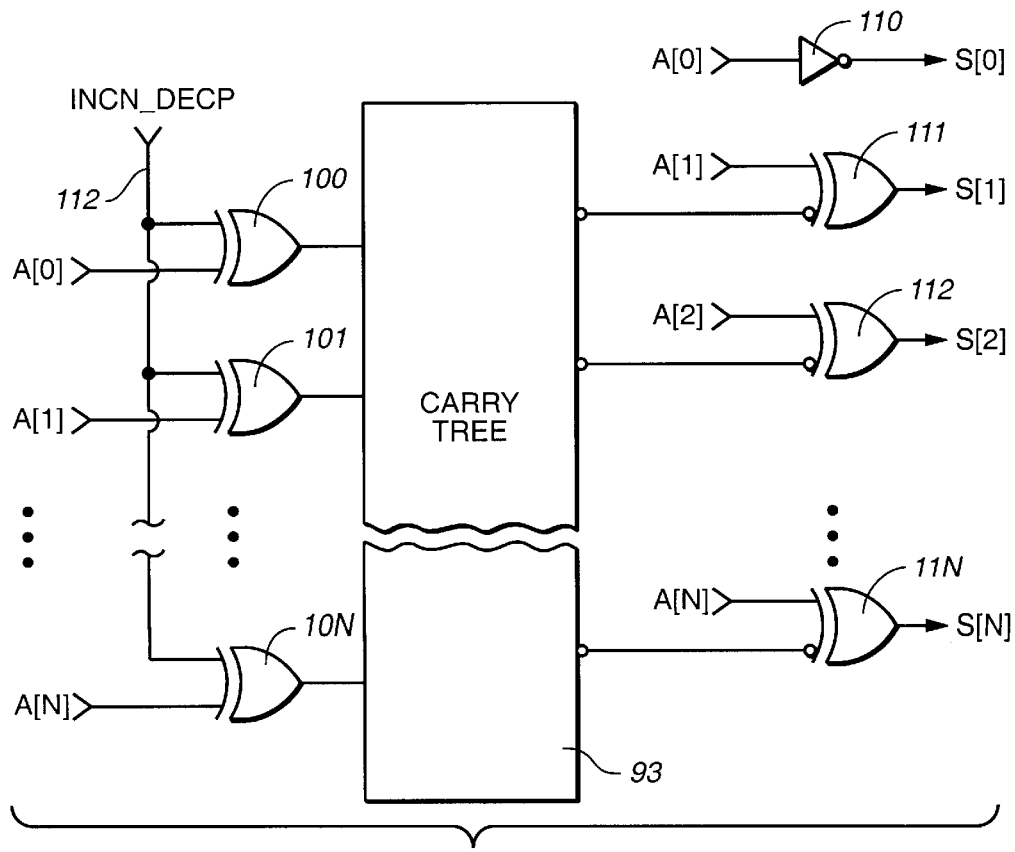
FIG._5

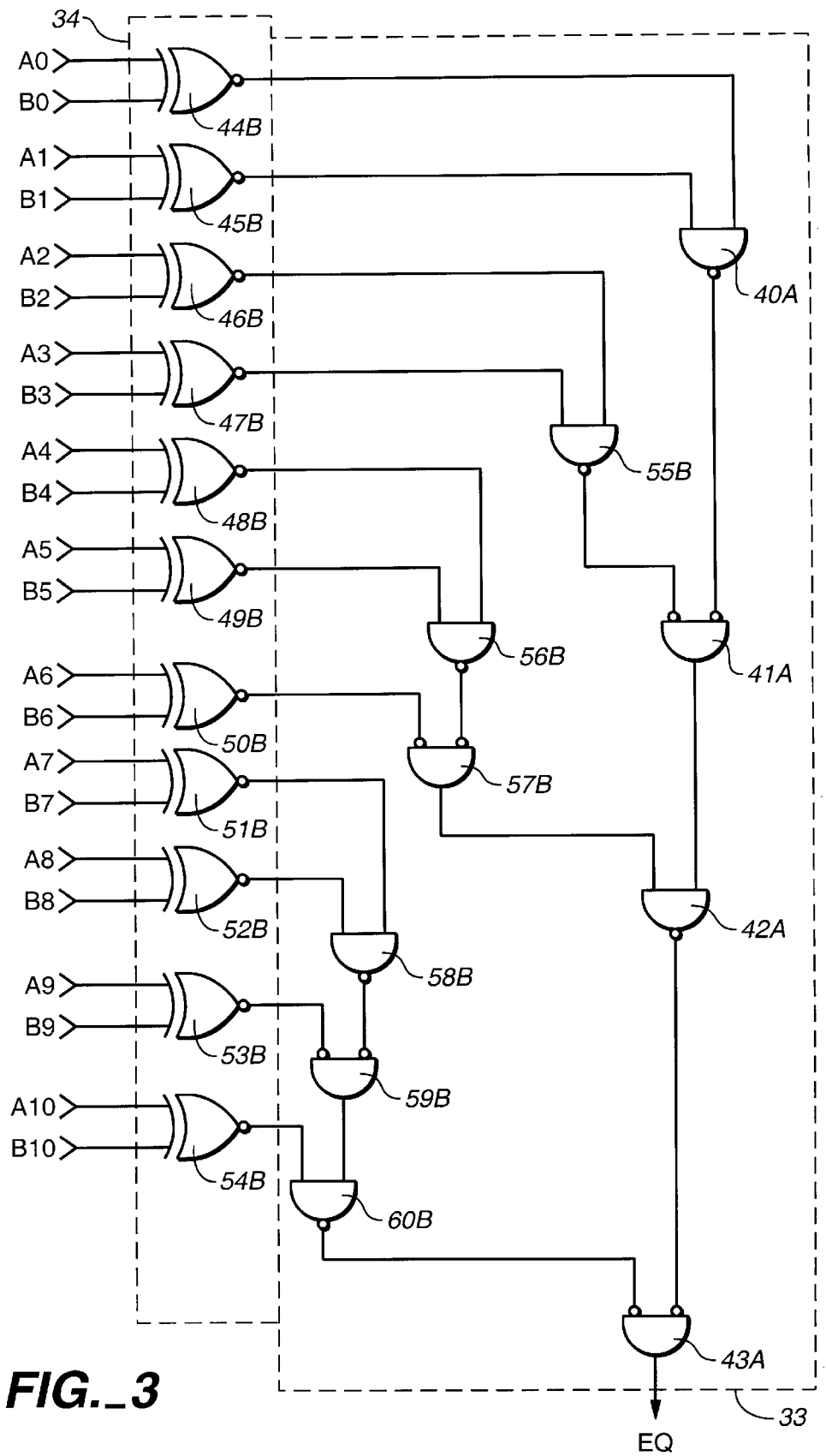
FIG._3

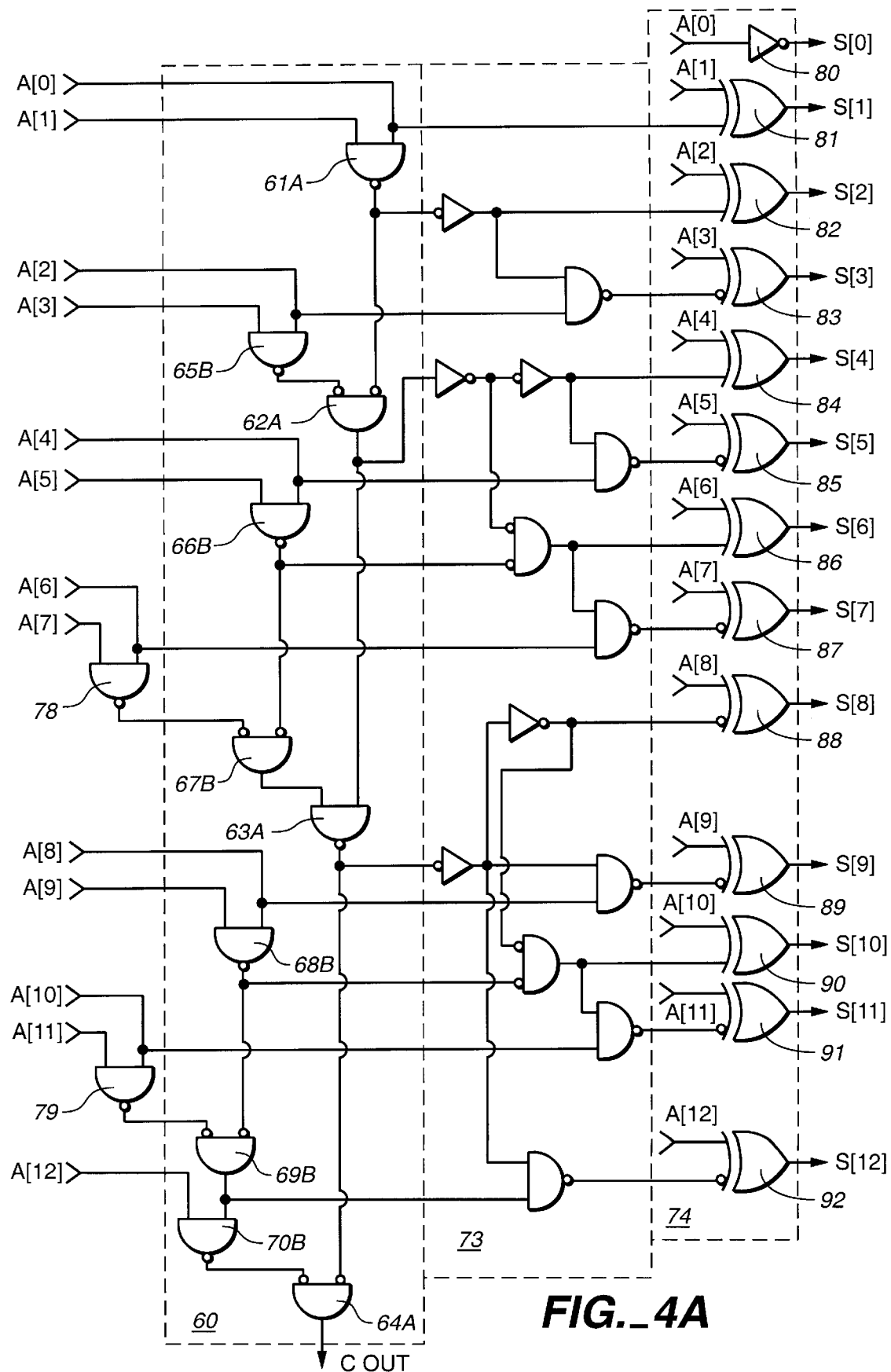
FIG._4A

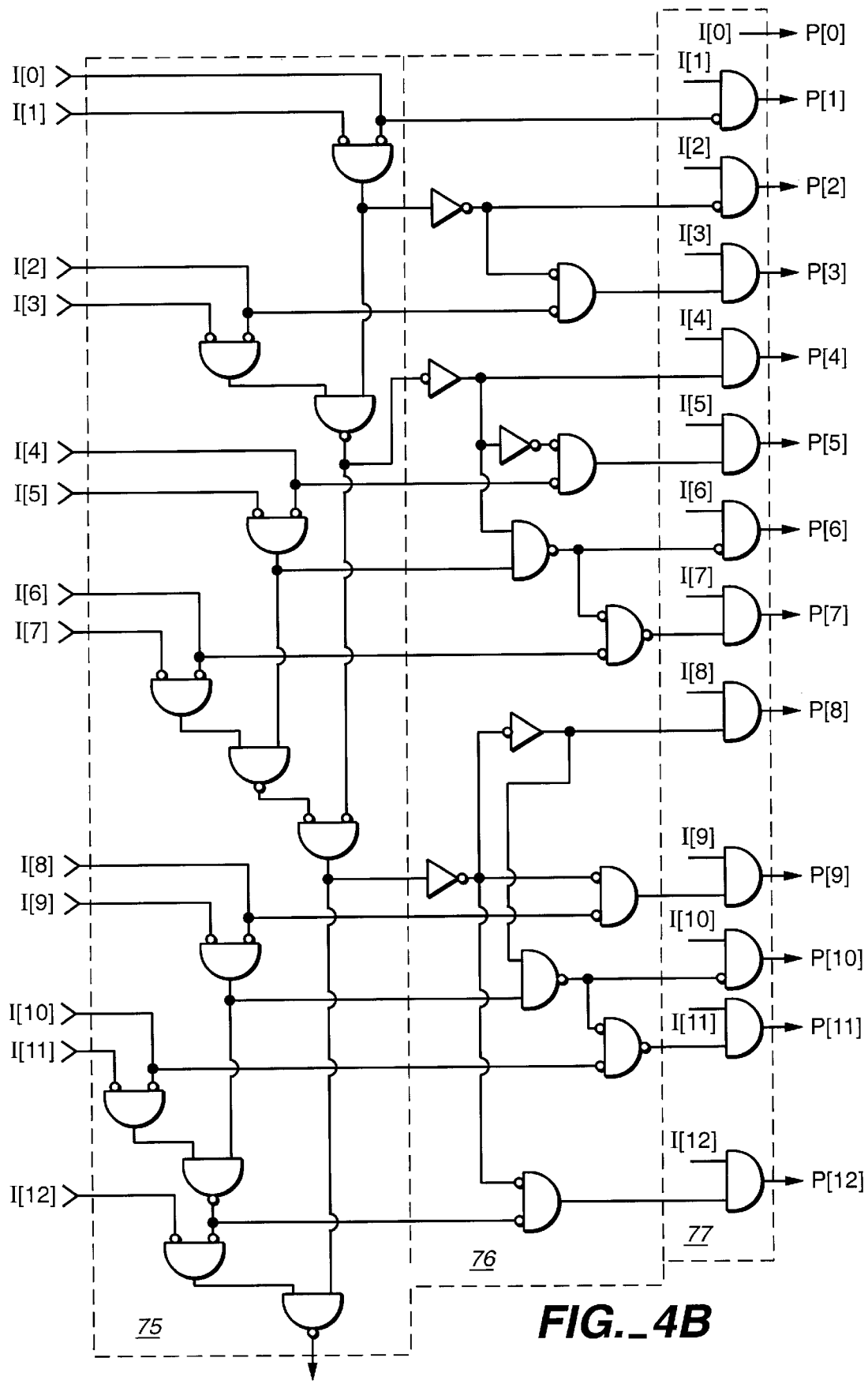
FIG._4B

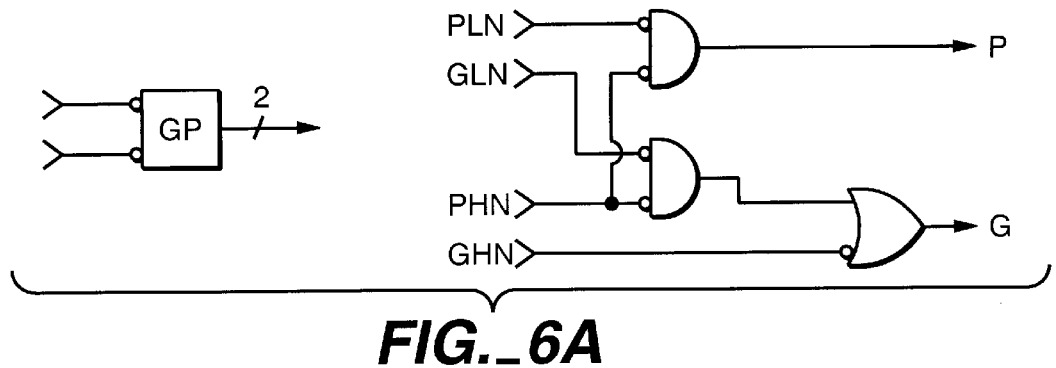
FIG._6A
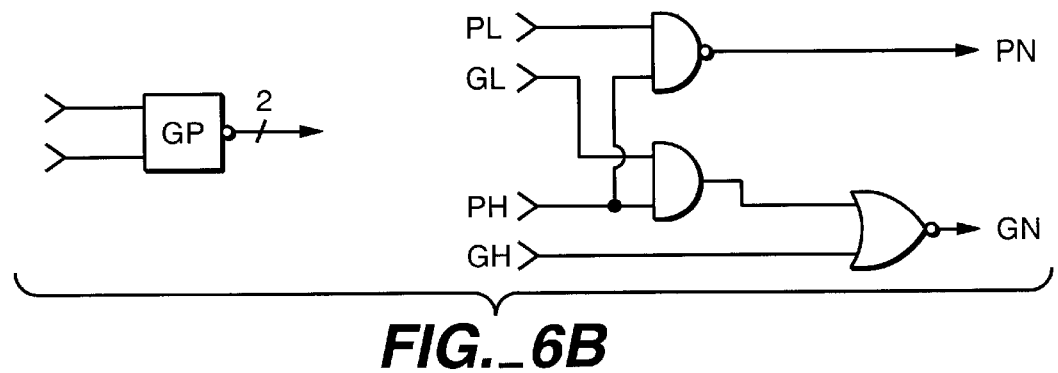
FIG._6B
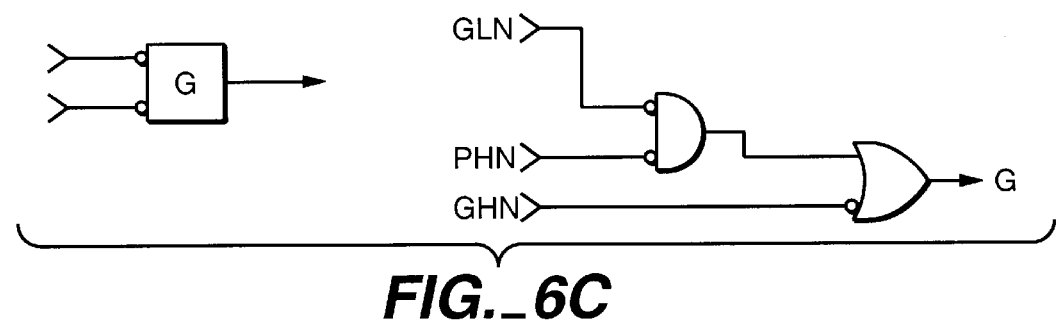
FIG._6C
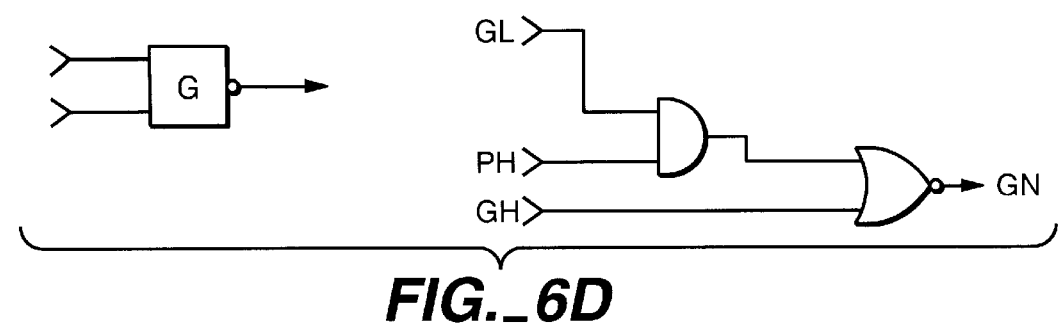
FIG._6D

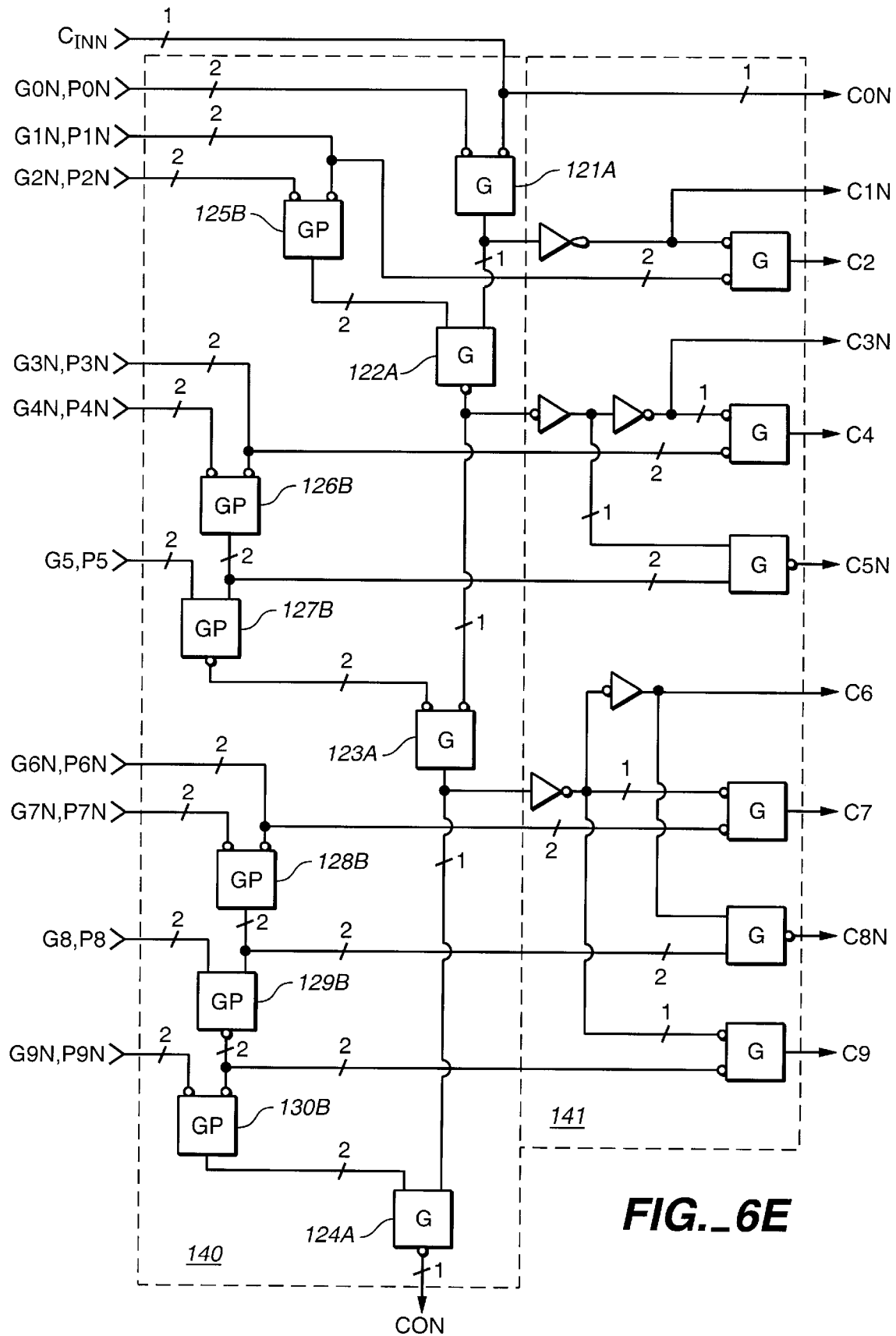
FIG._6E

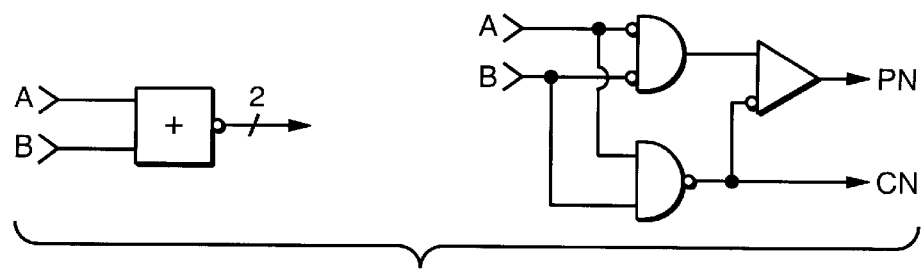
FIG._7A
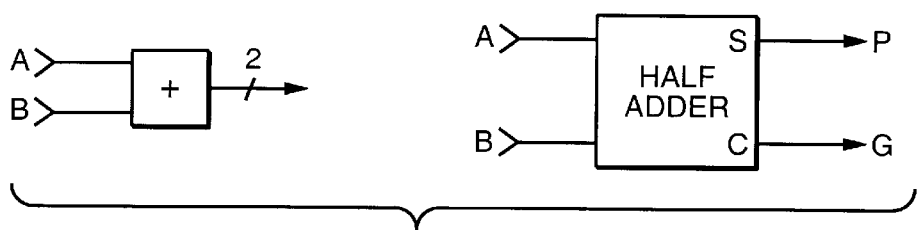
FIG._7B
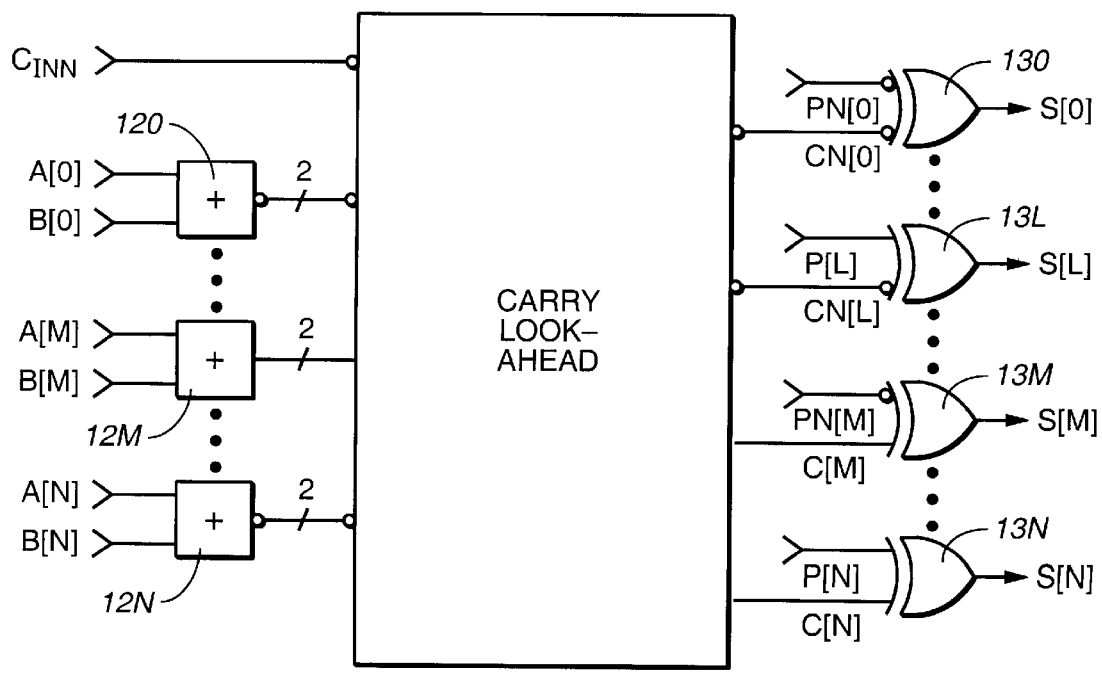
FIG._8

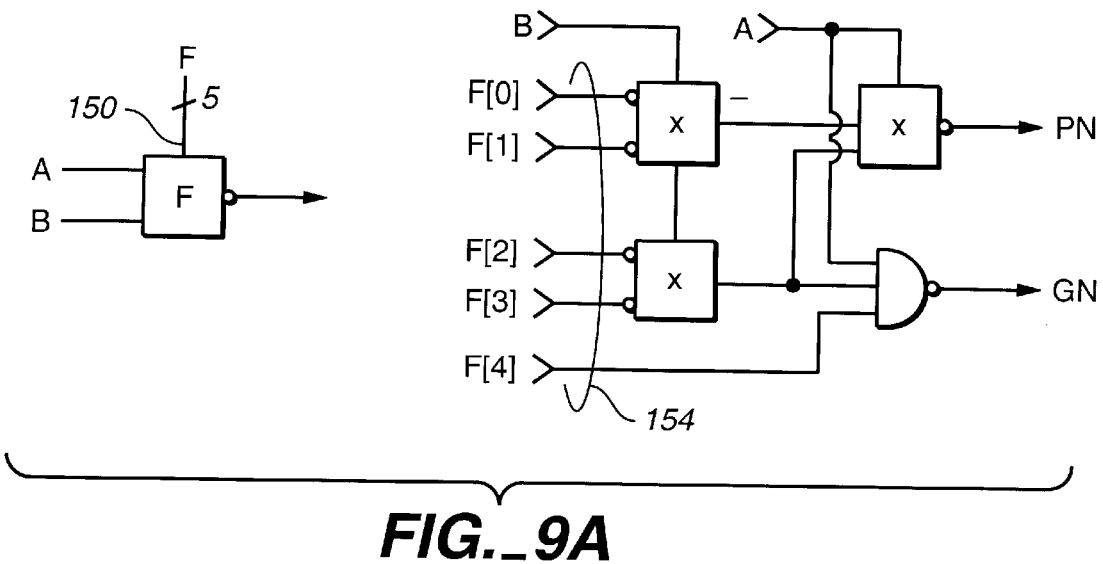
FIG._9A
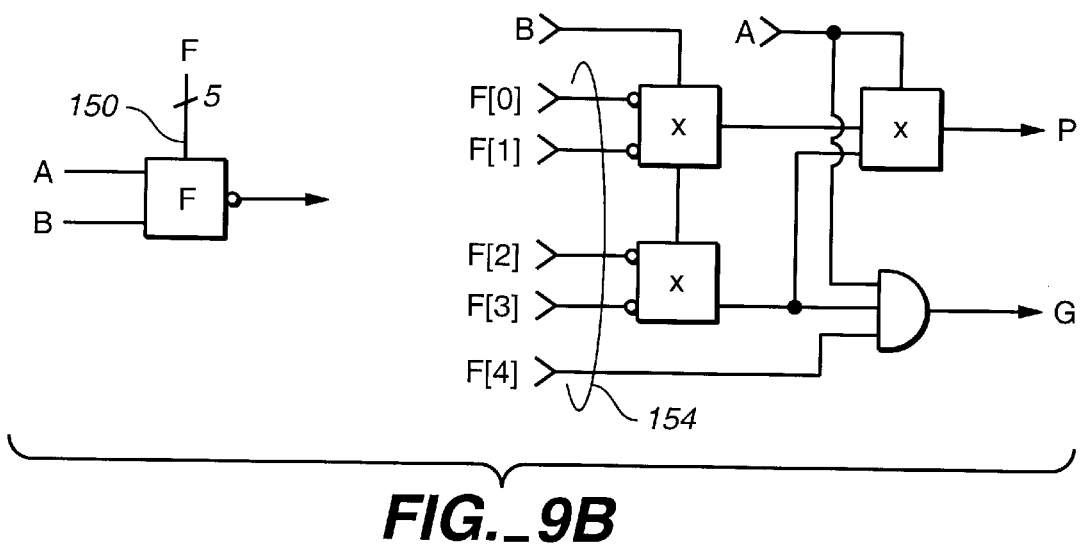
FIG._9B

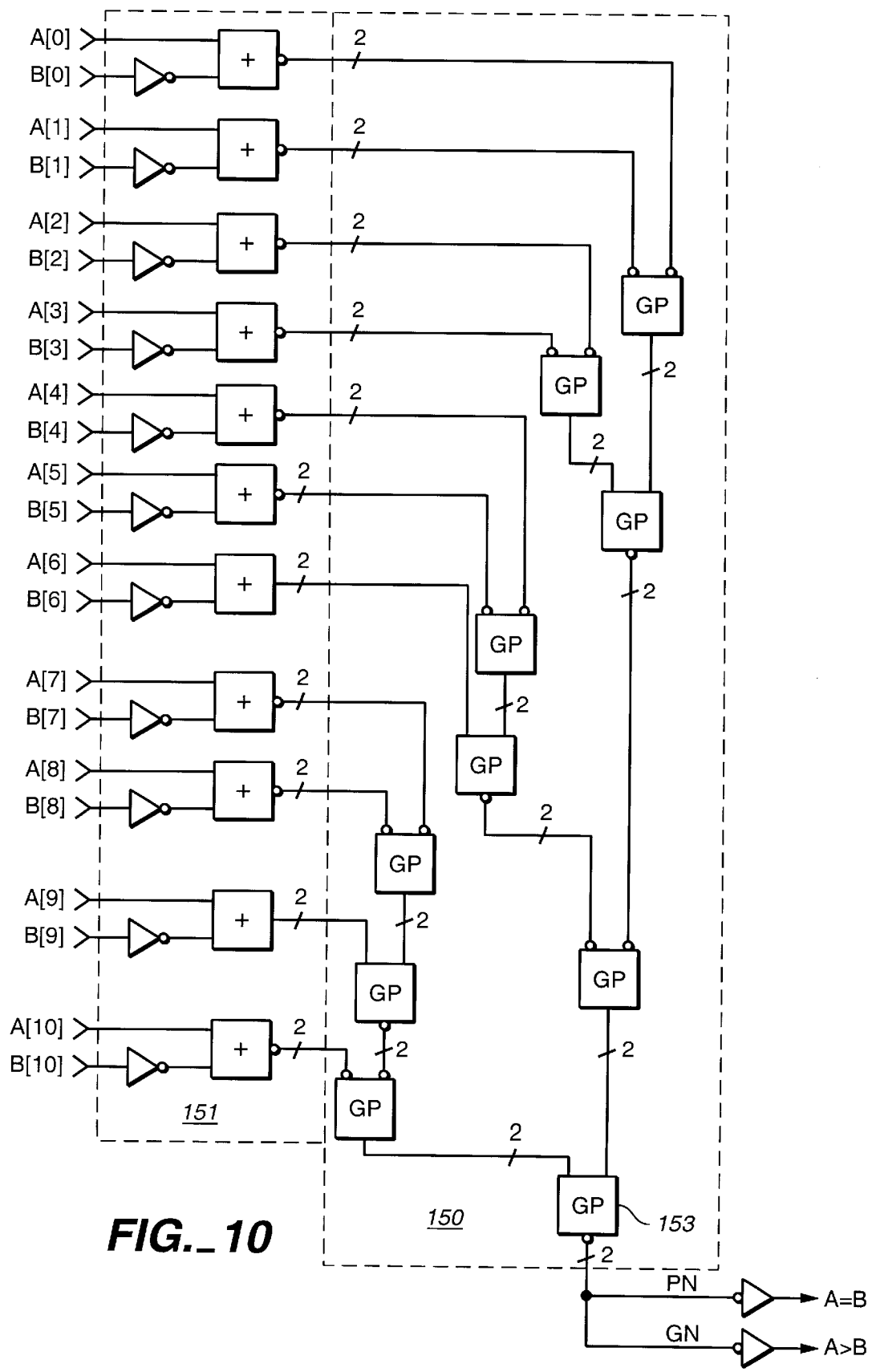
FIG._10

ARITHMETIC AND LOGIC FUNCTION CIRCUITS OPTIMIZED FOR DATAPATH LAYOUT

BACKGROUND OF THE INVENTION

The present invention is related to the field of integrated circuit design and, more particularly, to the circuit design of arithmetic and logic units.

There are two principal techniques of implementing integrated circuit logic to calculate arithmetic and logic functions. One technique is serial design. In this technique logic stages are serially connected so that the results of one stage are fed to another stage in a chain until the results of desired function are completely determined. Serial design occupies the smallest amount of integrated circuit area for a given function; however, the resulting functional unit is typically slow in most applications. Each stage must wait for the results of the previous stage to become available and each additional bit of width adds one or two more gate delays to the time for the results to appear.

The second technique is parallel lookahead design. In this technique logic blocks are connected in parallel. The higher order logic blocks do not have to wait for the lower order logic blocks to complete their operation. The higher order blocks receive their input signals nearly simultaneously with the lower order blocks. The output of earlier stages are fed forward in parallel to later stages which combine the outputs of earlier stages. This design has the highest performance for a given function; however, the parallel design occupies a lot of space on an integrated circuit.

The differences between these two design techniques have become more apparent as busses in microprocessors have become wider. Present busses having 32 bits render serial design far too slow. However, the space occupied by a parallel lookahead design is a significant factor in the layout of an integrated circuit. Busses of 64 bits make the space problem even more acute.

The present invention solves, or substantially mitigates, this design problem so that arithmetic and logic circuits can be designed with a circuit layout occupying far less space than a functionally equivalent parallel lookahead design. Nonetheless, operating speeds are close to that of parallel lookahead designs.

SUMMARY OF THE INVENTION

The present invention provides for a basic circuit having at least 16 input terminals and at least one output terminal in an integrated circuit device. The circuit has a plurality of logic blocks with each logic block having input and output nodes. These logic blocks are arranged in a primary chain and a plurality of secondary chains of serially connected logic blocks. The primary chain has a first logic block and a last logic block with the last logic block having an output node connected to the output terminal. At least one of the secondary chains has more than one logic block with the last logic block of each secondary chain having an output node connected to an input node of a primary chain logic block. The input terminals are connected only to input nodes of the secondary chain logic gates and to input nodes of the primary chain. With this circuit design, layout space on the integrated circuit is minimized.

The circuit performs logic or arithmetic functions corresponding to the logic blocks. For example, if the logic blocks are NAND and NOR logic gates, the gates can be arranged to create a zero detect circuit.

If the basic circuit is supplemented by a combination of input logic which conditions input signals into the basic circuit, merge logic which combines signals from the primary chain and the secondary chains of the basic circuit, and output logic which logically combines output signals from the merge circuit with input signals, other circuits may be designed. For example, input logic of Exclusive NOR gates plus primary and secondary chains of NAND and NOR logic gates can be arranged into an equality detection circuit. Generate/Propagate logic blocks and Generate logic blocks can be arranged in the basic circuit arrangement of primary and secondary chains and in merge logic to create a carry lookahead circuit. The advantages of minimized layout space and high-speed operations are retained. Other examples are illustrated below.

BRIEF DESCRIPTION OF THE DRAWINGS

FIG. 1 is a circuit having representative logic blocks connected according to the present invention;

FIG. 2A is a logic diagram of a circuit for detecting zero, according to the present invention; FIG. 2B is a logic diagram illustrating a portion of the FIG. 2A circuit using three-input logic gates;

FIG. 3 is a logic diagram of a circuit for determining if two sets of bits are equal, according to the present invention;

FIG. 4A is a logic diagram of an incrementor circuit, according to the present invention; FIG. 4B is a logic diagram of a priority logic circuit, which has a similar arrangement to that of the FIG. 4A circuit;

FIG. 5 is a logic diagram of an incrementor/decrementor circuit having portions of the circuit of FIG. 4A, according to the present invention;

FIGS. 6A–6D illustrate logic block symbols and corresponding logic diagrams for carry lookahead subcircuits; FIG. 6E is block diagram of a carry lookahead circuit according to the present invention using the logic blocks of FIGS. 6A–6D;

FIGS. 7A and 7B are logic block symbols and corresponding logic diagrams for half-adder circuits;

FIG. 8 is a logic diagram of an adder circuit using the logic blocks of FIGS. 7A and 7B, according to the present invention;

FIGS. 9A and 9B are logic block symbols and corresponding logic diagrams which may be substituted for the logic blocks in FIG. 8 to created an ALU circuit; and FIG. 10 is a logic block diagram of a compare circuit according to the present invention.

DETAILED DESCRIPTION OF PREFERRED EMBODIMENTS

FIG. 1 illustrates the general organization and elements of an arithmetic and logic circuit according to the present invention. The circuit has a primary chain of serially connected, representative logic blocks 10A–13A. Each logic block 10A–13A has one input terminal connected to the output terminal of another block to form the serial chain. Only the initial block 10A has its input terminals connected to input terminals of the circuit. The logic blocks are determined by the particular function of the arithmetic and logic circuit.

The other input terminals of the primary chain logic blocks 10A–13A are each connected to secondary chains of serially connected logic blocks. For example, the primary chain logic block 11A has one of its input terminals connected to the output terminal of a secondary chain logic block 14B. In this case, the secondary chain has only one logic block. On the other hand, the primary chain logic block 13A has one of its input terminals connected to a secondary chain of three logic blocks 17B–19B. In accordance with the present invention, the number of logic blocks in a secondary chain may be selected to balance as best as possible the number of gate delays to the input terminals of the connected primary chain logic block. For instance, the primary chain logic block 12A has two serially connected, primary chain logic gates 10A–11A at one input terminal and two serially connected, secondary chain logic gates 15B–16B at its second input terminal. The input signal delays to the logic block 12A are matched to a certain degree.

The following drawings illustrate implementations of specific arithmetic and logic circuits according to the present invention. FIG. 2A illustrates a zero detection circuit. The circuit generates a logic 1 output signal when all of the input signals I0–I19 are logic 0.

As shown, the logic blocks are NAND gates and NOR gates (drawn as the DeMorgan's equivalent logic circuits). The circuit is composed of main logic 35 and input logic 36. The main logic 35 has the primary and secondary chains of serially connected logic blocks, described above. The primary chain of serially connected logic blocks has NAND gates 21A and 23A, and NOR gates 22A and 24A. Each of the NAND and NOR gates 21A–24A (except for the initial logic gate 21A) is connected to secondary serial chains of NAND and NOR gates. For example, the NOR gate 22A has one input terminal connected to the main chain NAND gate 21A, while its second input terminal is connected to the secondary chain of NAND gate 28B. The number of gates in the secondary chain balances the number of gates in the main chain.

The input logic 36 is composed of NOR logic gates 37–39 and so on. Each NOR logic gate of the input logic 36 has each input terminal receiving one of the input signals I1–I19 and an output terminals which is connected to one of the input terminals of the main logic 35.

It should be noted that all the logic blocks for the zero detect circuit of FIG. 2A perform AND logic. (The serial connection of the NAND gates inverted outputs cancel the inverted inputs of the NOR gates.) Another feature of the present invention is the application of DeMorgan's theorem to minimize gate delays through a circuit as actually implemented on an integrated circuit. The examples shown in this description are implemented in CMOS logic. In the case of the FIG. 2A circuit, AND logic is implemented in silicon by a NAND gate or a NOR gate. Hence, the FIG. 2A circuit has alternating serial connections of NAND gates and NOR gates; though functionally, all of the logic gates in FIG. 2A are simple AND logic.

FIG. 2B is a portion of a zero detect circuit that illustrates the advantages and disadvantages of using wider gates with more than two inputs. A circuit using gates with more than two inputs can combine more inputs with fewer gates and fewer gate delays. However, a circuit using gates with more than two inputs has two disadvantages. First, gates with more than two inputs have more delay than two-input gates. (This is especially true for CMOS NOR gates.) The slower gates reduce or eliminate the advantage of fewer gate delays. Secondly, a circuit using gates with more than two inputs can require more wire. The cost in extra wire depends upon where a wide gate is used. Three cases are shown in FIG. 2B. Gate 30 in a secondary chain costs no extra wire. Gate 31 in a secondary chain requires an extra wire across a single gate. Gate 32 in the primary chain requires an extra wire across many gates. Thus, using wider gates in the secondary chains may help, but using wider gates in the primary chain may not.

FIG. 3 illustrates a circuit which compares two words, i.e., two sets of bits, A0–A10 and B0–B10. If each bit of one set matches the corresponding bit of the other set, a logic 1 output signal is generated. Otherwise, the output signal is 0. As in the case of FIG. 2A, the number of input bits is arbitrary and used for the purposes of explaining the present invention.

In this comparator circuit, the main logic 33, composed of primary and secondary chains of serially connected logic gates, is supplemented by input logic 34 composed of exclusive NOR gates 44B–54B. Each set of corresponding input bits are received by the input terminals of exclusive NOR gates 44B–54B. The organization illustrated in FIG. 1 is again followed. The primary chain of serially connected logic gates is formed by the NAND gates 40A, 42A and NOR gates 41A and 43A. An input terminal of each of the logic gates 40A–43A is connected to another logic gate in the primary serial chain. The second input terminals of the logic gates 41A–43A are connected to secondary chains of serially connected logic gates. For example, the NAND gate 42A in the primary chain has its second input terminal connected to a secondary chain of serially connected logic gates 56B and 57B.

A circuit according to the present invention can also be used as a portion of another circuit. An incrementor circuit is illustrated by FIG. 4A. The incrementor circuit increases the value of the input bits, A[0]–A[12], by 1 and generates the new value as output bits, S[0]–S[12]. In this circuit, the main logic 60 is supplemented by merge logic 73 and output logic 74, as outlined by dotted lines. There are also two NAND logic gates 78 and 79, which receive respectively input bits, A[6]–A[7] and A[10]–A[11]. The two NAND logic gates 78 and 79 form input logic to the main logic 60.

The main logic 60 has a primary chain of serially connected logic gates 61A–64A with secondary chains of serially connected logic gates 65B–70B in accordance with the present invention. The output signal from the NOR gate 64A is the carry signal for bits beyond S[0]–S[12]. In a manner as described previously, the logic gates of the primary chain and secondary chains receive the input bits A[0]–A[12]. Input bits, A[6]–A[7] and A[10]–A[11], are received through NAND logic gates 78 and 79 of the input logic, which supplements the main logic 60. Exclusive OR gates 81–92, forming the output logic 74, generate the output signals S[1]–S[12]. A simple inverter 80 generates the output signal S[0]. Logic gates of the merge logic 73, merge carry bits from portion 60 to generate carry bits to Exclusive OR gates 81–92. Again, note that not only do the logic gates in the secondary chains balance the gate delays through the primary chain, but also the implementation of the logic gates in silicon are selected for maximum operating speeds. The logic gates in the main logic 60 are connected with alternating NAND gates and NOR gates. The logic gates in the merge logic 73 are likewise so implemented. Even the input terminals of some of the Exclusive OR logic 81–92 are inverted (i.e., implemented with Exclusive NOR gates) when the received input signal is from a NAND logic gate.

The exemplary circuits of FIGS. 3 and 4A show the main logic of the present invention can be adapted for different functions with supplemental input logic (FIG. 3), merge logic (FIG. 4A) and output logic (FIG. 4A). It is evident how the input logic and output logic operate to condition the input signals into the main logic and to condition signals from the main logic or merge logic into output signals. The merge logic operates to merge output from the main chain with outputs from the secondary chains.

Another example of this organization is a priority logic circuit in FIG. 4B. A priority output is active when its input is active and no higher priority inputs are active. The priority circuit has main logic 75 composed of a primary chain and secondary chain of serially connected NAND and NOR gates. Merge logic 76 combines signals from the primary and secondary chains. Output logic 77, nearly all AND gates, conditions signals from the main logic 75 and the merge logic 76 for the output signals. The priority circuit may be transformed into a decrementor circuit by replacing the output AND gates with Exclusive OR gates and inverting output bit 0.

A decrementor circuit according to the present invention may also be derived from the incrementor circuit of FIG. 4A. A simple substitution of logic gates is made. A two-input NOR gate replaces each two-input NAND gate and an Exclusive NOR gate replaces each Exclusive OR gate. Two-input NOR gates and two-input Exclusive NOR gates are replaced by two-input NAND gates and Exclusive OR gates respectively.

The incrementor circuit in FIG. 4A can also be generalized into a circuit which can function as both an incrementor and a decrementor circuit. The main logic 60, merge logic 73, plus input logic gates 78 and 79 from FIG. 4A form a carry tree circuit 93. The carry tree 93 is used as illustrated in FIG. 5 to form an incrementor/decrementor circuit. The input terminals of the carry tree 93 are connected to the output terminals of N+1 Exclusive OR gates 100–10N, forming input logic. Each Exclusive OR gate 100–10N has two input terminals, one input terminal connected to the input signals A[0]–A[N] and the second input terminal connected to a control line 112. The control line 112 is set to a logic 0 for an incrementing function and a logic 1 for a decrementing function. The output terminals of the carry tree 93 are connected to one input terminal of Exclusive OR gates 111–11N. The other input terminals of the Exclusive OR gates 111–11N are connected to the input signals A[1]–A[N]. As in the case of FIG. 4A, the least significant order input bit, A[0], is flipped by a single inverter 110 for the least significant output bit, S[0]. The Exclusive OR gates 111–11N and the inverter 110 form output logic.

Thus far, the logic blocks arranged in a primary serial chain with branching secondary chains are simple logic gates. If the logic blocks are more complex structures, the present invention can also be used for the design of other circuits. Examples include carry lookahead units for adders and ALUs (Arithmetic Logic Units) in computer CPUs (Central Processing Units). FIGS. 6A–6D illustrate four different logic blocks and their corresponding logic diagrams for carry lookahead subcircuits. The "P" symbol represents the Propagate signal while the "G" symbol represents the Generate signal. The "L" and "H" symbols correspond to the low and high signals respectively. "N" stands for negated or inverted signals.

These logic blocks are arranged as illustrated in FIG. 6E to create a carry lookahead circuit. The carry lookahead circuit receives a carry in signal, $C_{INN}$, and the true or negated Generate and Propagate signals for the different order bits. Note again that the carry lookahead logic circuit shown in FIG. 6E has a primary chain of serially connected logic blocks 121A–124A connected to secondary chains of serially connected logic blocks, i.e., blocks 125B–130B.

These blocks form the main logic 140. Merge logic 141 completes the carry lookahead circuit.

The FIG. 6E carry lookahead circuit can be incorporated into an adder or an ALU. FIG. 8 shows the carry lookahead circuit of FIG. 6E in an adder circuit. The adder circuit receives a carry in bit, $C_{INN}$, and the bits of two words, A[0]–A[N] and B[0]–B[N], to add together. The result appears as the output bits, S[0]–S[N]. The symbols for the two types of half-adder blocks for the FIG. 8 adder circuit and their logic circuit diagram are illustrated in FIGS. 7A and 7B. These half-adder blocks 120–12N (forming input logic) receive the input bits, A[0]–A[N] and B[0]–B[N], of the two words. The particular half-adder block is selected from the circuits of FIGS. 7A and 7B for a half-adder block 120–12N so that its output signal polarities matches the input signal polarities of the carry lookahead circuit. The FIG. 8 adder circuit also has Exclusive OR logic 130–13N (forming output logic) whose output terminals carry the adder circuit output bits, S[0]–S[N]. The Exclusive OR logic 130–13N are connected to the carry lookahead circuit and the logic blocks 120–12N. Some of the Exclusive OR logic 130–13N have inverted input terminals which match the output polarities of the carry signals from the carry lookahead circuit of FIG. 6E and the propagate signals from the logic blocks 120–12N. The odd numbers of inversions are implemented by Exclusive NOR logic gates, and even numbers of inversions are implemented by Exclusive OR logic gates.

The same organization in FIG. 8 is also used to create a two-input ALU. However, in place of the logic blocks of FIGS. 7A and 7B, the F logic blocks illustrated in FIGS. 9A and 9B are used. The F logic blocks are composed of multiplexer blocks marked by the letter "x". Each F logic block receives a bit, A, from one input word and a corresponding bit, B, from the second input word. Note that the bus 154 represents the set of control lines F[0]–F[4], which determine the operation of the ALU.

Finally, a compare circuit can be designed from main logic which uses the Propagate/Generate logic blocks of FIGS. 6A–6D in combination with input logic formed by the half-adder blocks of FIGS. 7A and 7B. The compare circuit of FIG. 10 has main logic 150 composed of primary and secondary chains of the Propagate/Generate logic blocks of FIGS. 6A and 6B. The input logic 151 has the half-adder blocks of FIGS. 7A and 7B receiving bits from each of the two words, A[0]–A[10] and B[0]B[10], to be compared. The input bits of the word B are inverted. The output terminals of the compare circuit are the two output terminals of the last logic block 153 in the primary chain. If the inverted output signal of the Propagate output terminal is active, the two words are equal. If the inverted output signal of the Generate output terminal is active, then the word A is greater than the word B.

Thus, in this manner, the present invention provides for a design methodology by which a circuit can be designed which is only slightly slower than a fully parallel design technique, while occupying only slightly more space than that occupied by a fully serial technique. The advantages of the invention are most apparent when the number of input bits (and output bits, depending upon the function of the circuit) is at least 16 bits.

While the above is a complete description of the preferred embodiments of the present invention, various alternatives, modifications and equivalents may be used. It should be evident that the present invention is equally applicable by making appropriate modifications to the embodiment described above. For example, the number of input and output bits in the circuits above was selected for purposes of explanation and was not intended to be limiting. Therefore, the above description should not be taken as limiting the scope of invention which is defined by the metes and bounds of the appended claims.

What is claimed is:

1. In an integrated circuit, a high-speed circuit having at least 16 primary input terminals, at least one output terminal, and a plurality of logic blocks, each logic block having input and output nodes, said circuit comprising a primary chain of serially connected logic blocks having a first logic block and a last logic block, said last logic block having an output node connected to said output terminal; and a plurality of secondary chains of serially connected logic blocks, at least one of said secondary chains having more than one logic block, a last logic block of each secondary chain having an output node connected to an input node of a logic block of said primary chain;

said primary input terminals connected only to input nodes of said secondary chain logic gates and to input nodes of said primary chain;

whereby layout space of said circuit on said integrated circuit is minimized and said circuit performs logic or arithmetic functions corresponding to said logic blocks.

2. The circuit of claim 1 wherein each put node of each primary chain logic block is connected to a primary input terminal through the same number of logic blocks as another input node.

3. The circuit of claim 1 wherein each of said logic blocks comprises a logic gate.

4. The circuit of claim 3 wherein each logic gate has two input nodes only.

5. The circuit of claim 3 wherein said logic gates implement AND logic.

6. The circuit of claim 5 wherein said logic gates comprise NAND gates and NOR gates.

7. In an integrated circuit, a high-speed circuit having a plurality of primary input terminals, comprising main logic having at least 16 input terminals, at least one output terminal, and a plurality of logic blocks, each logic block having input and output nodes, said main logic comprising a primary chain of serially connected logic blocks having a first logic block and a last logic block, said last logic block having an output node connected to said main logic output terminal; and a plurality of secondary chains of serially connected logic blocks, at least one of said secondary chains having more than one logic block, a last logic block of each secondary chain having an output node connected to an input node of a logic block of said primary chain;

said main logic input terminals connected only to input nodes of said secondary chain logic gates and to input nodes of said primary chain; and input logic comprising a plurality of logic blocks, each logic block having a first input node connected to a first primary input terminal, a second input node connected to a second primary input terminal, and an output node connected to a main logic input terminal;

whereby layout space of said circuit on said integrated circuit is minimized and said circuit performs logic or arithmetic functions corresponding to said logic blocks.

8. The circuit of claim 7 wherein each input node of each primary chain logic block is connected to a main logic input terminal through the same number of logic blocks as another input node.

9. The circuit of claim 7 wherein each of said logic blocks comprises a logic gate.

10. The circuit of claim 9 wherein each logic gate of said main logic has two input nodes only.

11. The circuit of claim 9 wherein said logic gates of said main logic implement AND logic.

12. The circuit of claim 11 wherein said logic gates of said main logic comprise NAND gates and NOR gates, and wherein said logic gates of said input logic comprise NOR gates, said logic gates are arranged so that said high-speed circuit operates as a zero detection circuit.

13. The circuit of claim 11 wherein said logic gates of said main logic comprise NAND gates and NOR gates, and wherein said logic gates of said input logic comprise Exclusive OR gates, said logic gates arranged so that said high-speed circuit operates to determine the equality of two sets of input bits.

14. The circuit of claim 7 wherein each logic block of said main logic has four input nodes and two output nodes only, and each logic block of said input logic has two input nodes and two output nodes only.

15. The circuit of claim 14 wherein said logic blocks of said main logic comprise Generate/Propagate logic blocks, and said logic blocks of said input logic comprise half-adder logic blocks, said Generate/Propagate logic blocks and said half-adder logic blocks arranged so that said high-speed circuit operates as a compare circuit.

16. In an integrated circuit, a high-speed circuit having a plurality of primary input terminals and an output terminal, said circuit comprising main logic having at least 16 input terminals, at least one output terminal, and a plurality of logic blocks, each logic block having input and output nodes, said main logic comprising a primary chain of serially connected logic blocks having a first logic block and a last logic block; and a plurality of secondary chains of serially connected logic blocks, at least one of said secondary chains having more than one logic block, a last logic block of each secondary chain having an output node connected to an input node of a logic block of said primary chain;

said main logic input terminals connected only to input nodes of said secondary chain logic gates and to input nodes of said primary chain;

merge logic combining signals from said primary and secondary chains of said main logic, said merge logic generating said combined signals at a plurality of output terminals; and output logic comprising a plurality of logic blocks, each logic block having a first input node connected to a merge logic output terminal, a second input node connected to a primary input terminal, and an output node connected to an output terminal of said high-speed circuit;

whereby layout space of said circuit on said integrated circuit is minimized and said circuit performs logic or arithmetic functions corresponding to said logic blocks.

17. The circuit of claim 16 wherein each input node of each primary chain logic block is connected to a main logic input terminal through the same number of logic blocks as another input node.

18. The circuit of claim 17 wherein each of said logic blocks comprises a logic gate.

19. The circuit of claim 17 wherein each logic gate of said main logic has two input nodes only.

20. The circuit of claim 19 wherein said logic gates of said main logic implement AND logic.

21. The circuit of claim 16 further comprising input logic comprising a plurality of logic blocks, each logic block having input nodes connected to primary input terminals receiving input bits, and an output node connected to a main logic input terminal.

22. The circuit of claim 21 wherein each of said logic blocks comprises a two-input logic gate.

23. The circuit of claim 21 wherein said logic gates of said main logic comprise NAND gates and NOR gates, and wherein said logic gates of said output logic comprise Exclusive OR gates, said logic gates arranged so that said high-speed circuit operates as an incrementor or decrementor circuit.

24. The circuit of claim 23 wherein said logic gates of said main logic comprise NAND gates and NOR gates, and wherein said logic gates of said output logic comprise Exclusive OR gates, and further comprising.

input logic having a plurality of Exclusive OR gates, each Exclusive OR gate having a first input node connected to a primary input terminal receiving a first set input bit, a second input node connected to a control signal line, and an output node connected to an input terminal of said incrementor circuit;

whereby said circuit operates as an incrementor or decrementor circuit response to a signal on said control signal line.

25. The circuit of claim 20 wherein said logic gates of said main logic comprise NAND gates and NOR gates, and wherein said logic gates of said output logic comprise AND gates arranged so that said high-speed circuit operates as a priority logic circuit.

26. In an integrated circuit, a high-speed circuit having a plurality of primary input terminals and an output terminal, said circuit comprising main logic having at least 32 input terminals, at least one output terminal, and a plurality of logic blocks, each logic block having input and output nodes, said main logic comprising a primary chain of serially connected logic blocks having a first logic block and a last logic block; and a plurality of secondary chains of serially connected logic blocks, at least one of said secondary chains having more than one logic block, a last logic block of each secondary chain having an output node connected to an input node of a logic block of said primary chain;

said main logic input terminals connected only to input nodes of said secondary chain logic gates and to input nodes of said primary chain; and merge logic having logic blocks combining signals from said primary and secondary chains of said main logic, said merge logic generating said combined signals at a plurality of output terminals;

whereby layout space of said circuit on said integrated circuit is minimized and said circuit performs logic or arithmetic functions corresponding to said logic blocks.

27. The circuit of claim 26 wherein said logic blocks of said main logic comprise Generate/Propagate logic blocks and Generate logic blocks, and said logic blocks of said merge logic comprise Generate logic blocks, said Generate/Propagate logic blocks and said Generate blocks arranged so that said high-speed circuit operates as a carry lookahead circuit.

* * * * *